United States Patent
Llach-Pinsach et al.

(10) Patent No.: US 6,842,197 B1
(45) Date of Patent: Jan. 11, 2005

(54) AUTOMATIC EXTRACTION METHOD OF THE STRUCTURE OF A VIDEO SEQUENCE

(75) Inventors: Joan Llach-Pinsach, Barcelona (ES); Philippe Salembier, Esplugas (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 606 days.

(21) Appl. No.: 09/610,712

(22) Filed: Jul. 6, 2000

(30) Foreign Application Priority Data

Jul. 6, 1999 (EP) .......................................... 99401684
Oct. 20, 1999 (EP) .......................................... 99402594

(51) Int. Cl.[7] .............................. H04N 5/14; G06K 9/62
(52) U.S. Cl. ........................................ 348/700; 382/225
(58) Field of Search ............................... 382/225, 226, 382/170; 375/240.08, 240.26

(56) References Cited

U.S. PATENT DOCUMENTS

| | | | | |
|---|---|---|---|---|
| 5,592,226 A | * | 1/1997 | Lee et al. | 375/240.14 |
| 5,774,593 A | * | 6/1998 | Zick et al. | 382/236 |
| 5,828,809 A | * | 10/1998 | Chang et al. | 386/69 |
| 5,835,667 A | * | 11/1998 | Wactlar et al. | 386/96 |
| 5,956,026 A | * | 9/1999 | Ratakonda | 345/723 |
| 5,963,670 A | * | 10/1999 | Lipson et al. | 382/224 |
| 6,195,458 B1 | * | 2/2001 | Warnick et al. | 382/173 |
| 6,278,736 B1 | * | 8/2001 | De Haan et al. | 375/240.16 |
| 6,307,550 B1 | * | 10/2001 | Chen et al. | 345/418 |
| 6,389,168 B2 | * | 5/2002 | Altunbasak et al. | 382/224 |
| 6,393,054 B1 | * | 5/2002 | Altunbasak et al. | 375/240 |
| 6,411,724 B1 | * | 6/2002 | Vaithilingam et al. | 382/100 |
| 6,473,459 B1 | * | 10/2002 | Sugano et al. | 375/240.16 |
| 6,535,639 B1 | * | 3/2003 | Uchihachi et al. | 382/225 |

OTHER PUBLICATIONS

Taehwan Shin et al, "Hierarchical Scene Change Detection in an MPEG–2 Compressed Video Sequence", 1998 IEEE, ISCAS 1998, Proceedings of the 1998 IEEE Int'l Symposium on Circuits and Systems, Monterey Conference Ctr, Monterey, CA USA pp. 253–256, vol. 4 of 6.

Jonathan D. Courtney, "Automatic Video Indexing Via Object Motion Analysis", Pattern Recognition, vol. 30, No. 4, pp. 607–625, 1997.

* cited by examiner

*Primary Examiner*—Chris Kelley
*Assistant Examiner*—Dave Czekaj (57) ABSTRACT

The invention relates to a method intended to automatically create a description of a video sequence—i.e. its table of contents—by analyzing the video sequence. First is a temporal segmentation of the video shots of the sequence, using camera motion parameters. This segmentation uses a similarity criterion involving, for sub-entities of each shot, the level of homogeneity of these sub-entities on the motion parameters of the camera used to acquire the original images and generate the bitstream constituting the processed sequence.

8 Claims, 6 Drawing Sheets

AUTOMATIC EXTRACTION METHOD OF THE STRUCTURE OF A VIDEO SEQUENCE

FIELD OF THE INVENTION

The invention relates to a method for an automatic extraction of the structure of a video sequence that corresponds to successive frames. The invention also relates to a method for indexing data that includes said definition method, to a device for carrying out said indexing method, and to an image retrieval system in which said method is implemented. This invention will be very useful in relation with the MPEG-7 standard.

BACKGROUND OF THE INVENTION

The future MPEG-7 standard is intended to provide a flexible and extensible framework for defining a standard set of descriptors that can be used to describe various types of multimedia documents. The description thus associated with a given content allows fast and efficient searching for material of a user's interest. The invention relates more specifically to the case of representation of video sequences.

A video sequence is a series of sequentially ordered images (in time). Prior to its storage in a database, the corresponding videostream is segmented into elementary units (or shots, a shot being a sequence of contiguous frames generated during a continuous operation and representing a continuous action in time and space), that are then identified and indexed. A video indexing technique is described for instance in the document "Automatic video indexing via object motion analysis", J. D. Courtney, Pattern Recognition, volume 30, number 4, April 1997, pp.607–625. As explained in said document, the logical organization of video 'sequences may be determined by means of a hierarchical segmentation, in the same manner a text is subdivided into chapters and paragraphs. However, in many cases, this temporal segmentation seems to be not completely appropriate, for instance in applications such as sport (soccer, tennis games) where video shots can be very long.

SUMMARY OF THE INVENTION

It is an object of the invention to propose a method that is able to automatically create the description of a video sequence, that is to say a table of contents of said sequence, on the basis of a new, specific criterion.

To this end, the invention relates to a method such as described in the introductory paragraph of the description and which moreover comprises:

(1) a shot detection step, provided for detecting the boundaries between consecutive shots, a shot being a set of contiguous frames without editing effects;

(2) a partitioning step, provided for splitting each shot into sub-entities, called micro-segments;

(3) a clustering step, provided for creating a final hierarchical structure of the processed video sequence.

Such a method allows to obtain a partition of each shot of the processed video sequence into temporal sub-entities, here called micro-segments. Preferably, these micro-segments present, according to the proposed criterion, a high level of homogeneity on the motion parameters of the camera with which the original images have been captured (these images having been converted into a video bitstream that constitutes said processed video sequence).

More precisely, the homogeneity of each micro-segment is computed on a motion histogram, each bin of which shows the percentage of frames of the sequence with a specific type of motion. A micro-segment is perfectly homogeneous when it presents a single combination of camera motion parameters along all its frames, the histogram bins then being equal to 1 or 0. On the contrary, if the bins of the histogram are not equal to either 1 or 0, i.e. present intermediate values indicating that a micro-segment is not perfectly homogeneous, in order to segment a shot, a distance between two segments is computed, based on the homogeneity of the segments union. Said homogeneity is itself deduced from the histogram of a micro-segment and the different motion types, the homogeneity of a shot being equal to the homogeneity of its micro-segments weighted by the length of each of them, a fusion between any pair of segments being decided or not according to the value of the homogeneity of the shot with respect to a predefined threshold T(H) and assuming that the selected segments have already been merged, and such a possible merging process between micro-segments ending when there is no further pair of neighbouring micro-segments that can be merged.

It is another object of the invention to propose a video indexing device including means for carrying out such a method and associated indexing means for adding a label to each element of the hierarchical structure defined thanks to this method.

It is still another object of the invention to propose an image retrieval system including such a video indexing device and associated means for performing on the basis of the categorization issued from said indexing operation any image retrieval using one or several features of this image.

BRIEF DESCRIPTION OF THE DRAWINGS

The present invention will now be described, by way of example, with reference to the accompanying drawings in which.

DETAILED DESCRIPTION OF THE INVENTION

The goal of a table of contents for a video sequence is to define the structure of this sequence in a hierarchical fashion, like in a text document. The original sequence is therefore subdivided into sub-sequences which can also be divided into shorter sub-sequences. At the end of this division process, the shortest entity to be described will be the micro-segment.

Figure 1:
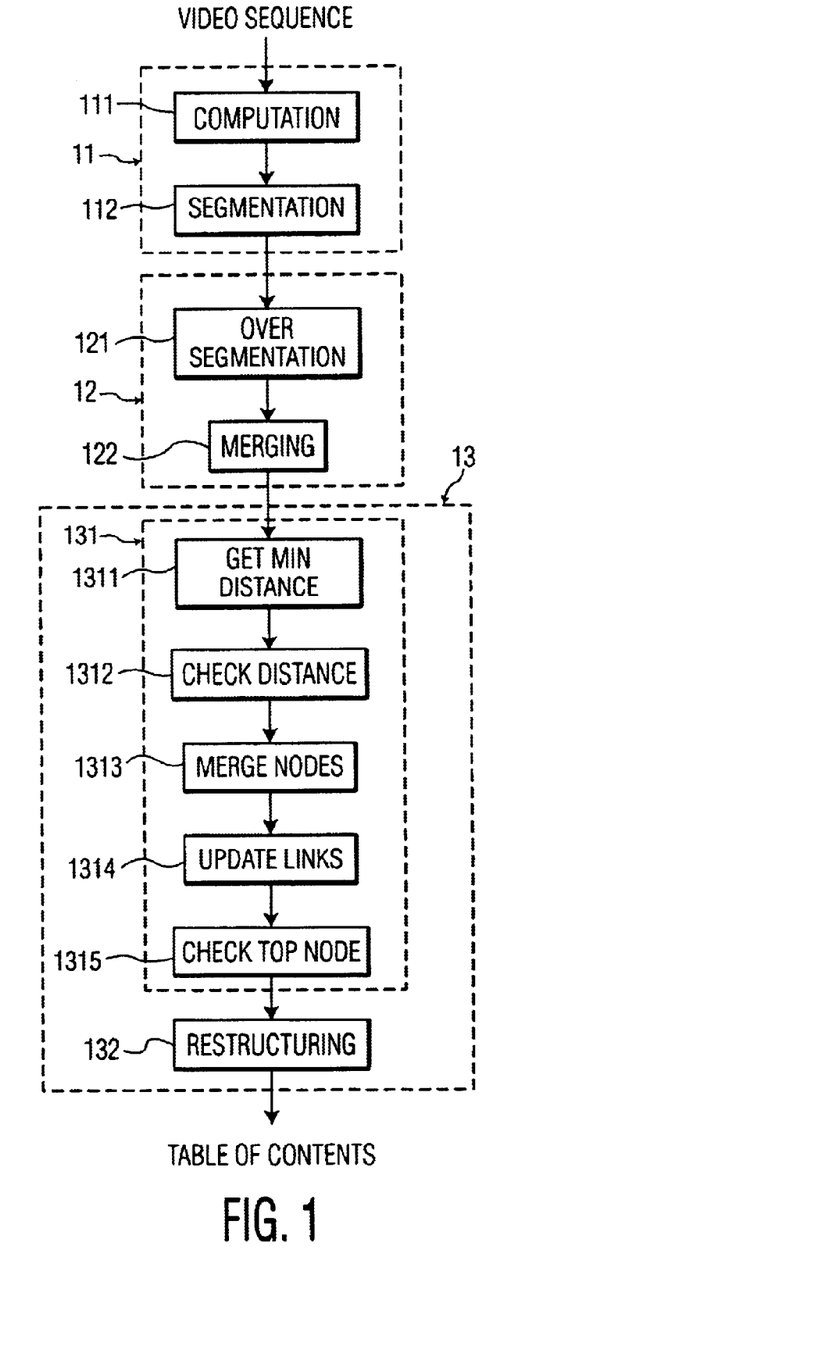
FIG. 1 shows a block diagram of the definition method according to the invention.

More precisely, the method according to the proposed strategy is divided into three steps, which are, as shown in FIG. 1: a shot detection step 11 (in a sequence of pictures, a video shot is a particular sequence which shows a single background, without editing effects such as cuts, which define a sharp transition, wipes, which correspond to a sliding window effect, mates, which let a dark blob invade the frames, dissolves, which represent a gradual change from one camera record to another one by linear combination of the frames, and so on), a partitioning step 12 of the detected shots, and a shot clustering step 13.

The first step 11 is provided for splitting the input video sequence into shots constituting the input data for the next steps. This step must allow to detect the transitions between consecutive shots, which is made by means of two main sub-steps: a computation sub-step 111, allowing to determine a mean Displaced Frame Difference (mDFD) curve, and a segmentation sub-step 112.

Figure 2:
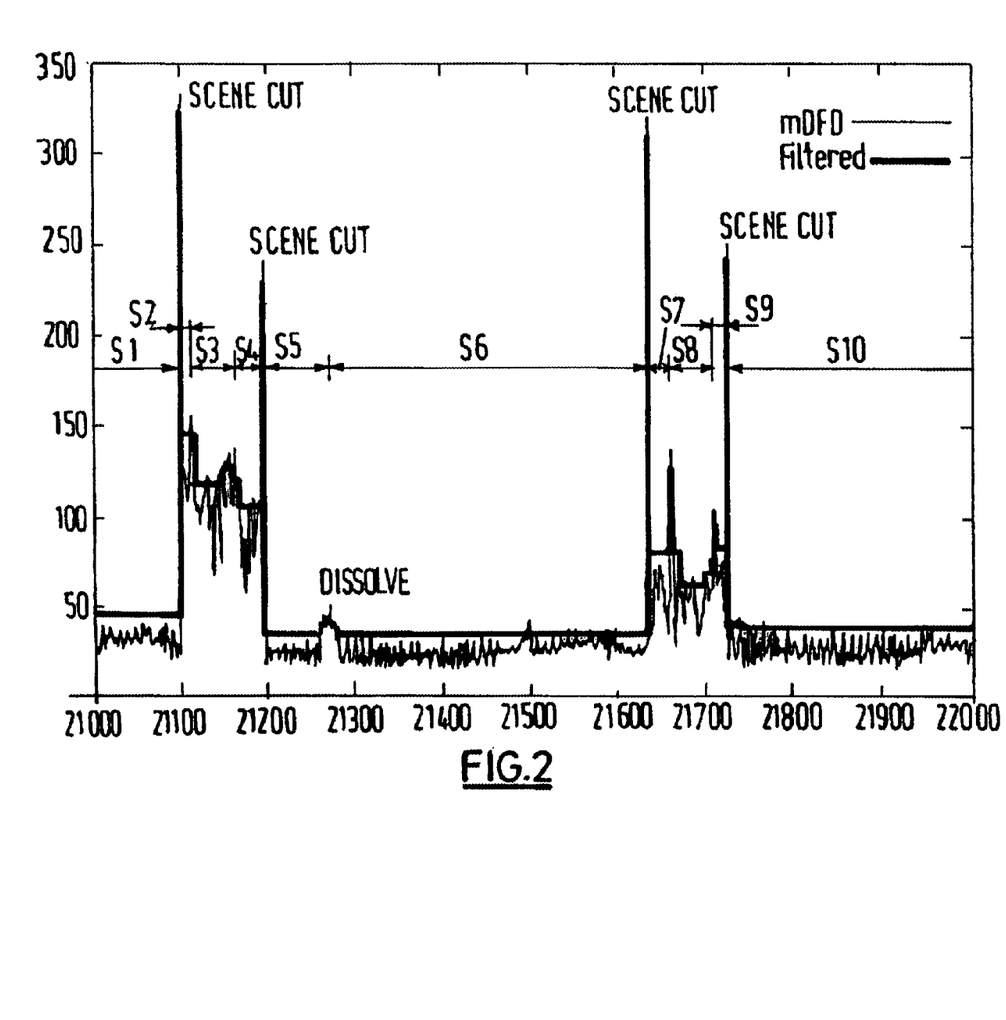
FIG. 2 illustrates an example of mDFD curve for a given sequence of frames.

The mDFD curve computed during the sub-step 111 is obtained taking into account both luminance and chrominance information. With, for a frame at time t, the following definitions:

$$\text{luminance } Y = \{f_k(i,j,t)\}_{k=Y} \tag{1}$$

$$\text{chrominance components } (U,V) = \{f_k(i,j,t)\}_{k=U,V} \tag{2}$$

the DFD is given by:

$$DFD_k(i,j;\, t-1,\, t+1) = f_k(i,j,\, t+1) - f_k(i-d_x(i,j),\, j-d_y(i,j),\, t-1) \tag{3}$$

and the mDFD by:

$$mDFD(t) = \frac{1}{I_x I_y} \sum_k^{Y,U,V} w_k \sum_{i,j}^{I_x,I_y} |DFD_k(i,j;\, t-1,\, t-1)| \tag{4}$$

where $I_x$, $I_y$ are the image dimensions and $w_k$ the weights for Y, U, V components. An example of the obtained curve (and of the corresponding filtered one), showing ten shots $s_1$ to $s_{10}$, is illustrated in FIG. 2 with weights that have been for instance set to $\{w_Y, w_U, w_V\} = \{1, 3, 3\}$. The transitions between consecutive shots can be abrupt changes from one frame to the following one, or more sophisticated, like dissolves, fades, and wipes: the highest peaks of the curve correspond to the abrupt transitions (frames 21100, 21195, 21633, 21724), while, on the other side, the oscillation from frame 21260 to frame 21279 corresponds to a dissolve and the presence of large moving foreground objects in frames 21100–21195 and 21633–21724 creates high level oscillations of the mDFD curve.

The sub-step 112, provided for detecting the video editing effects and segmenting the mDFD curve into shots, uses a threshold-based segmentation to extract the highest peaks of the mDFD curve (or another type of mono-dimensional curve). Such a technique is described for instance in the document "Hierarchical scene change detection in an MPEG-2 compressed video sequence", T.Shin and al, Proceedings of the 1998 IEEE International Symposium on Circuits and Systems, ISCAS'98, vol.4, March 1998, pp.253–256.

The partitioning step 12 is a temporal segmentation provided for splitting each detected shot into sub-entities called micro-segments. This temporal segmentation step, applied to each detected shot separately, consists of two sub-steps: an oversegmentation sub-step 121, intended to divide each shot into so-called microsegments which must show a perfect homogeneity, and a merging sub-step 122.

In order to carry out the first sub-step 121, it is necessary to define first what is called a distance (the distances thus defined will allow to compare the micro-segments), and also a parameter allowing to assess the quality of a micro-segment or a partition (=a set of micro-segments). In both cases, a motion histogram, in which each one of the bins shows the percentage of frames with a specific type of motion and which is defined as indicated by the following relation (5), is used:

$$H_s[1] = \frac{N_i}{L_s} \tag{5}$$

where s represents the label of the concerned micro-segment inside the shot, i the motion type (these motions are called trackleft, trackright, boomdown, boomup, tiltdown, tiltup, panleft, panright, rollleft, rollright, zoomin, zoomout, fixed), $L_s$ the length of said concerned micro-segment, s, and $N_i$ the number of frames of the micro-segment s with motion type i (it is possible that $\Sigma\, H_s[i] > 1$, since different motions can appear concurrently).

Figure 3:
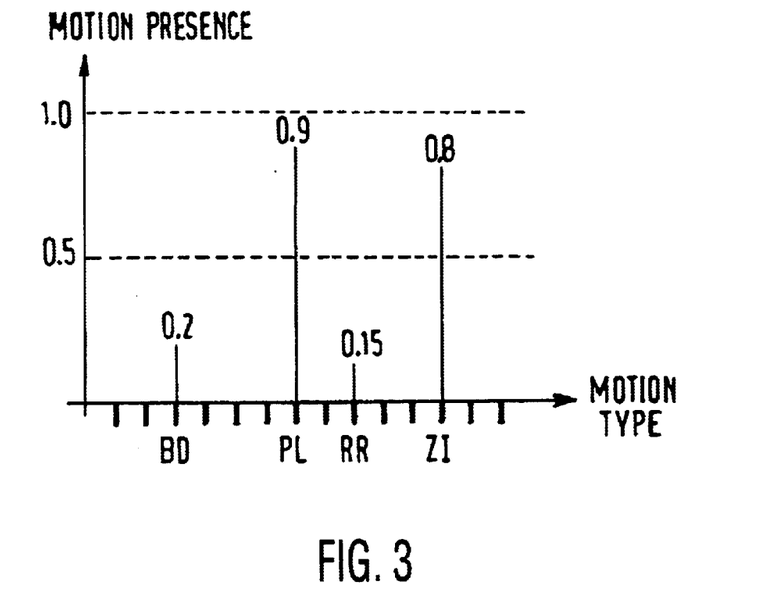
FIG. 3 shows an example of histogram illustrating the measure of the segment homogeneity.

A micro-segment is assumed to be perfectly homogeneous when it presents a single combination of camera motion parameters along all its frames; or to be not homogeneous when it presents important variations on these parameters. The micro-segment homogeneity is computed on its histogram (relation (5)): if a micro-segment is perfectly homogeneous, the bins of its histogram are equal either to 0 (the considered motion does not appear at all) or to 1 (the motion appears on the whole micro-segment), while if it is not, the bins of the histogram present intermediate values. The measure of the micro-segment homogeneity is then obtained by measuring how much its histogram differs from the ideal one (i.e. it is computed how much the bins of the histogram differ from 1 or 0). The distance corresponding to bins with high values is the difference between the bin value and 1; analogously, for bins with small values, the distance is the bin value itself. An example of histogram is shown in FIG. 3, the axes of which indicate for each motion type its proportion (=motion presence): two motion types introduce some error because the motion does not appear in all the frames of the micro-segment (panleft PL and zoomin ZI), and two other ones (boomdown BD and rollright RR) introduce some error for the opposite reason.

Mathematically, the homogeneity of a micro-segment s is given by the relation (6):

$$H(s) = \sum_i e(i) \tag{6}$$

where: $e(i) = 1 - H_s[i]$ if $H_s[i]\, 0,5$ $e(i) = H_s[i]$ if $H_s[i] < 0,5$ $H_s[i]$ = histogram of the micro-segment s i = motion type.

The homogeneity of a shot S is then equal to the homogeneity of its micro-segments, weighted by the length of each of them, as illustrated by the following equation (7):

$$H(S) = \frac{1}{L(S)} \sum_{j=1}^{j=N} L_j \cdot H(s_j) \tag{7}$$

where $$L(S) = \sum_{1}^{N} L_j$$

is the total length of the shot S and N is the number of micro-segments said shot contains (it may be noted that small values of H(S) correspond to high levels of homogeneity). The distance between two micro-segments s1 and s2 is then the homogeneity of the micro-segments union:

$$d(s_1, s_2) = H(s_1 \cup s_2) \qquad (8)$$

The temporal segmentation can now be resumed. The initial oversegmentation sub-step 121 allows to oversegment the concerned shot in order to obtain a set of perfectly homogeneous micro-segments, which corresponds to the following relation (9):

$$H(s)=0, \text{ whatever } s \text{ included in } S \qquad (9)$$

Figure 4:
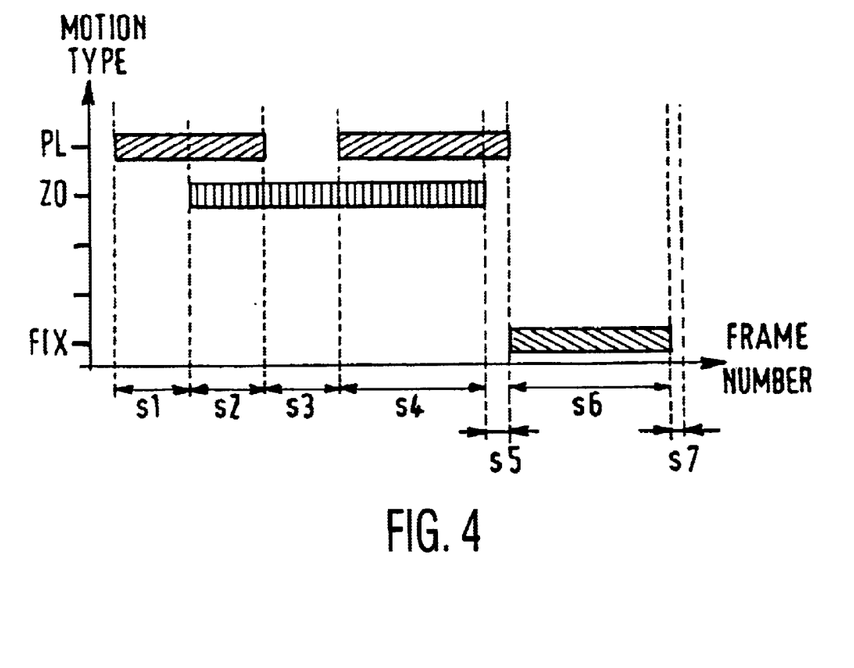
FIG. 4 illustrates the process of initial oversegmented partition creation.

An example of how to obtain this initial oversegmented partition is shown in FIG. 4 (the axes of which indicate the frame number and the corresponding motion type), with motion types panleft (PL), zoomout (ZO) and fixed (FIX), $s_1$ to $s_7$ designating the micro-segments (camera motion parameters may be unknown for some frames: in this example, the last frames of the shot—the micro-segment $s_7$—do not have any parameter associated). The merging sub-step 122 comprises first a computation operation, in which the distance between all neighbouring micro-segments (temporally connected) is computed using the equation (8) for selecting the closest pair of micro-segments (for possible merging during the next operation), and a fusion decision operation, in which, in order to decide if the selected pair of micro-segments will be merged, the homogeneity of the shot (according to the equation (7)) is computed, assuming that the minimum distance micro-segments have already been merged. The following fusion criterion is applied:

merge if H(S) threshold T(H)

do not merge if H(S)>threshold T(H)

(this fusion criterion is global: the decision depends on the homogeneity of the resulting partition, and not exclusively on the homogeneity of the resulting micro-segment). If the merging is done, a new iteration starts at the level of the second sub-step (a second computation operation is then carried out, and so on . . . ). The merging process ends when there is no pair of neighbouring micro-segments that can still be merged.

The third step 13, a shot clustering one provided for merging groups of consecutive shots into more coherent entities, is divided into two sub-steps: a shot merging sub-step 131, in which pairs of shots are grouped together for creating a binary tree, and a tree structuring sub-step 132, for restructuring said binary tree in order to reflect the similarity present in the video sequence.

The shot merging sub-step 131 is provided for yielding a binary tree which represents the merging order of the initial shots: the leaves represent these initial shots, the top node the whole sequence, and the intermediate nodes the sequence that are created by the merging of several shots. The merging criterion is defined by a distance between shots, and the closest shots are first merged. In order to compute the distance between shots, it is necessary to define a shot model providing the features to be compared and to set the neighbourhood links between them (which indicate what merging can be done). The process ends when all the initial shots have been merged into a single node or when the minimum distance between all couples of linked nodes is greater than a specified threshold.

The shot model must obviously allow to compare the content of several shots, in order to decide what shots must be merged and which is their merging order. In still images, luminance and chrominance are the main features of the image, while in a video sequence motion is an importance source of information due to the temporal evolution. So, average images, histograms of luminance and chrominance information (YUV components) and motion information will be used to model the shots.

For implementing the shot merging sub-step 131, it is necessary to carry out the five following operations: (a) to get a minimum distance link (operation 1311), (b) to check a distance criterion (operation 1312); (c) to merge nodes (operation 1313); (d) to update links and distances (operation 1314); (e) to check the top node (operation 1315).

In the operation 1311, both the minimum and the maximum distance are computed for every pair of linked nodes. The maximum distance is first checked: if it is higher than a maximum distance threshold d(max), the link is discarded, otherwise the link is taken into account. Once all links have been scanned, the minimum distance is obtained.

In the operation 1312, in order to decide if the nodes pointed by the minimum distance link must be merged, the minimum distance is compared to a minimum distance threshold d(min): if it is higher than said threshold, no merging is performed and the process ends, otherwise pointed nodes are merged and the process goes on.

In the operation 1313, nodes pointed by the minimum distance links are merged: In the operation 1314, said links are updated to take into account the merging that has been done and, once links have been updated, the distance of those links which point to the new mode is recomputed. In the final operation 1315, the number of remaining nodes is checked: if all initial shots have been merged into a single node, the process ends, otherwise a new iteration begins.

Figure 5:
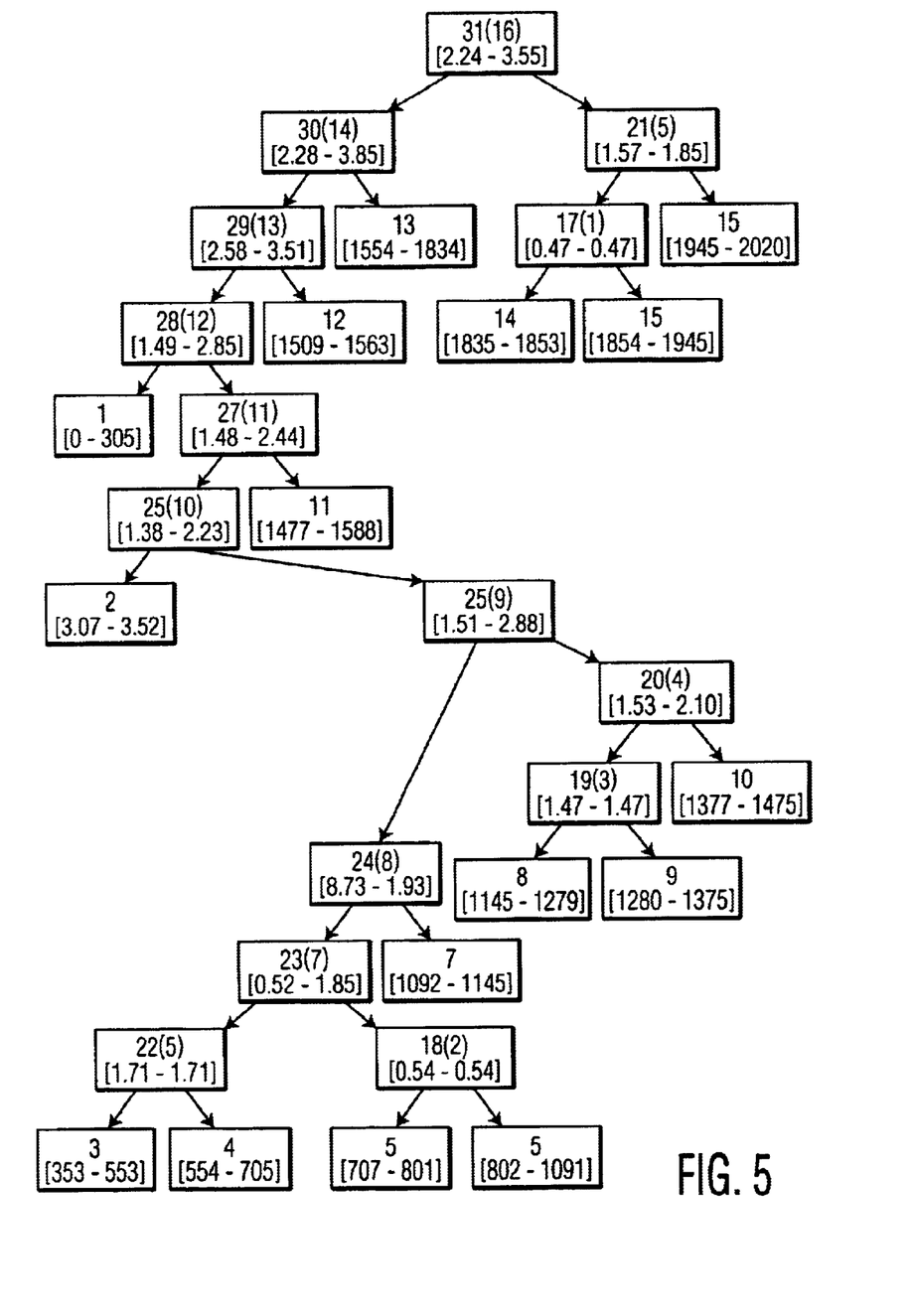
FIG. 5 shows a binary tree such as created by implementation of a shot merging sub-step provided in the definition method according to the invention.

The shot merging sub-step 131 may yield a single tree if all the initial shots are similar enough or a forest if initial shots are quite different. An example of binary tree for the creation of a table of contents is shown in FIG. 5. Inside the leaf nodes of this tree, its label and, between brackets, the starting and ending frame numbers of the shot have been indicated; inside the remaining nodes, the label, the fusion order (between parenthesis) and the minimum and maximum distance between its two siblings.

The tree restructuring sub-step 132 is provided for restructuring the binary tree obtained in the sub-step 131 into an arbitrary tree that should reflect more clearly the video structure. To this end, it is decided to remove the nodes that have been created by the merging process but that do not convey any relevant information, said removal being done according to a criterion based on the variation of the similarity degree (distance) between the shots included in the node:

if the analyzed node is the root node (or one of the root nodes if various binary trees have been obtained after the merging process), then the node is preserved, and it will appear in the final tree;

if the analyzed node is a leaf node (i.e. corresponds to an initial shot), then it has also to remain in the final tree;

otherwise, the node will be kept in the final tree only if the following conditions (10) and (11) are satisfied:

$$|d(\min)[\text{analyzed node}] - d(\min)[\text{parent node}]| < T(H) \qquad (10)$$

$$|d(\max)[\text{analyzed node}] - d(\max)[\text{parent node}]| < T(H) \qquad (11)$$

Figure 6:
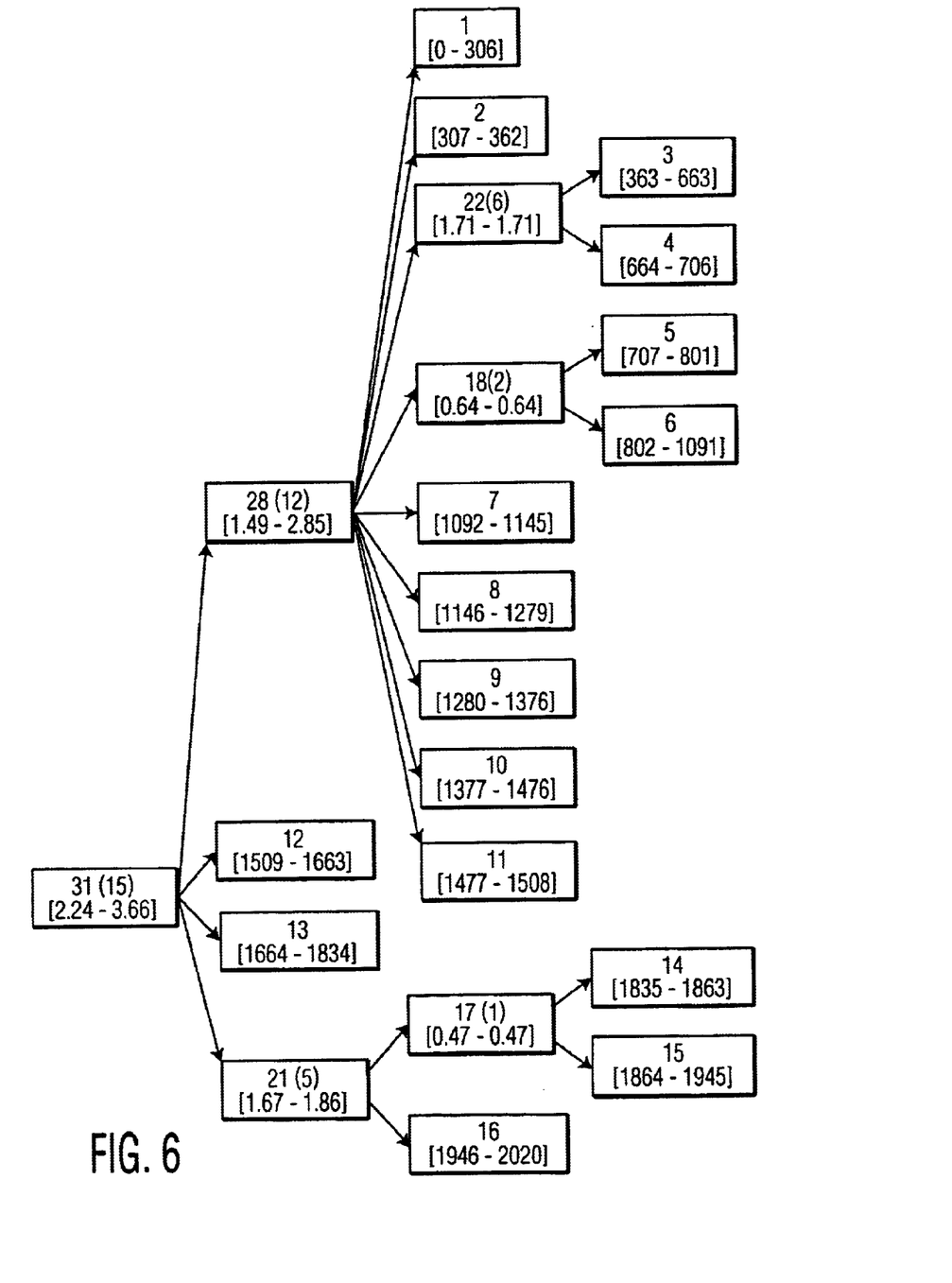
FIG. 6 shows the tree yielded after a tree restructuring sub-step.

As shown in FIG. 6, the tree resulting from the restructuring sub-step 132 represents more clearly the structure of the video sequence: nodes in the second level of the hierarchy (28, 12, 13, 21) represent the four scenes of the sequence, while nodes in the third (or occasionally in the fourth) level represent the initial shots.

Figure 7:
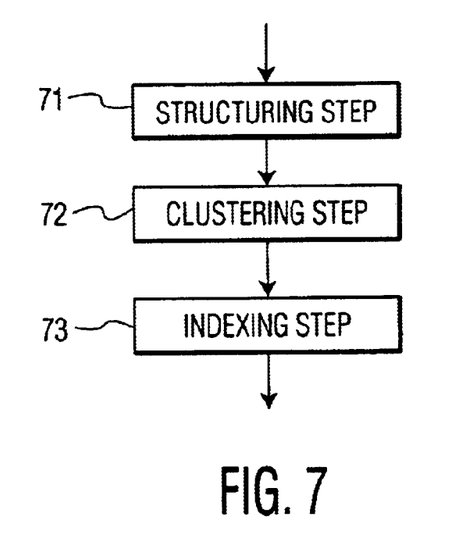
FIG. 7 illustrates a method for indexing data that have been processed according to the invention.

The invention is not limited to the implementation described above, from which modifications or broader applications may be deduced without departing from the scope of the invention. For instance the invention also relates to a method for indexing data that have been processed according to the previously described method. Such a method, illustrated in FIG. 7, comprises a structuring step 71, carrying out a subdivision of each processed sequence into consecutive shots and the splitting of each of the obtained shots into sub-entities (or micro-segments), and a clustering step 72, creating the final hierarchical structure. These steps 71 and 72, respectively similar to the steps 11–12 and to the step 13 previously described, are followed by an additional indexing step 73, provided for adding a label to each element of the hierarchical structure defined for each processed video sequence.

Figure 8:
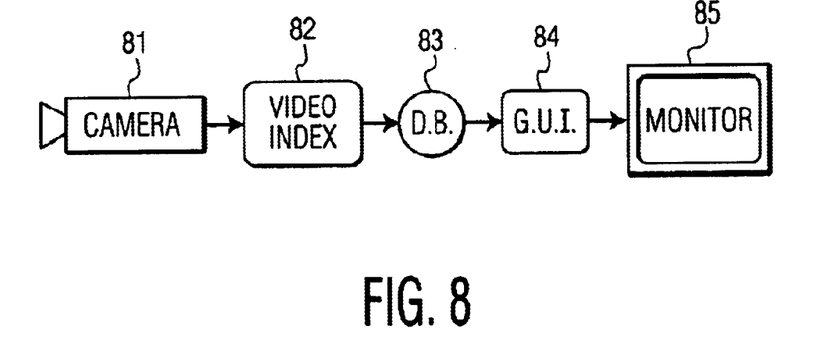
FIG. 8 illustrates an image retrieval system implementing said indexing method and allowing, thanks to appropriate associated means, to perform an image retrieval based on the categorization issued from such an indexing operation.

The invention also relates to an image retrieval system such as illustrated in FIG. 8, comprising a camera 81, for the acquisition of the video sequences (available in the form of sequential video bitstreams), a video indexing device 82, for carrying out said data indexing method (said device captures the different levels of content information in said sequences by analysis, hierarchical segmentation, and indexing on the basis of the categorization resulting from said segmentation), a database 83 that stores the data resulting from said categorization (these data are sometimes called metadata), a graphical user interface 84, for carrying out the requested retrieval from the database, and a video monitor 85 for displaying the retrieved information (the invention also relates, obviously, to the video indexing device 82, that allows to implement the method according to the invention).

What is claimed is:

1. A method for an automatic extraction of the structure of a video sequence that corresponds to successive frames, comprising the following steps:
   (1) a shot detection step, provided for detecting the boundaries between consecutive shots, a shot being a set of contiguous frames without editing effects;
   (2) a partitioning step, provided for splitting each shot into sub-entities, called micro-segments comprising a plurality of temporal sub-entities;
   (3) a clustering step, provided for creating a final hierarchical structure of the processed video sequence,
   wherein the a motion histogram on which a homogeneity of a micro-segment is computed includes a plurality of bins, each bin of which shows the percentage of frames with a specific type of motion.

2. A method according to claim 1, wherein said partitioning step uses a criterion involving the level of homogeneity on the motion parameters of the camera used to generate the processed video sequence.

3. A method according to claim 1, wherein, if the bins of the histogram are not equal to either 1 or 0, i.e. present intermediate values indicating that a micro-segment is not perfectly homogeneous, a distance between two micro-segments is computed, based on the homogeneity of the micro-segments union, said homogeneity being itself deduced from the histogram of a micro-segment and the different motion types, the homogeneity of a shot being equal to the homogeneity of its micro-segments weighted by the length of each of them, a fusion between any pair of micro-segments being decided or not according to the value of the homogeneity of the shot with respect to a predefined threshold T(H) and assuming that the selected micro-segments have already been merged, and such a possible merging process between micro-segments ending when there is no further pair of neighboring micro-segments that can be merged.

4. A method for an automatic extraction of the structure of a video sequence that corresponds to successive frames, comprising the following steps:
   (1) a shot detection step, provided for detecting the boundaries between consecutive shots, a shot being a set of contiguous frames without editing effects;
   (2) a partitioning step, provided for splitting each shot into sub-entities, called micro-segments;
   (3) a clustering step, provided for creating a final hierarchical structure of the processed video sequence;
   wherein said shot detection step uses a similarity criterion based on a computation of the mean displaced frame difference curve and the detection of the highest peaks of said curve.

5. A method for indexing data available in the form of a video sequence that corresponds to successive frames, comprising the following segmentation steps:
   (1) a structuring step, provided for sub-dividing said sequence into consecutive shots and splitting each of said shots into sub-entities called micro-segments comprising a plurality of temporal sub-entities;
   (2) a clustering step, provided for creating on the basis of said segmentation a final hierarchical structure of the processed video sequence;
   (3) an indexing step, provided for adding a label to each elements of said hierarchical structure;
   wherein the a motion histogram on which the homogeneity of a micro-segment is computed includes a plurality of bins, each bin of which shows the percentage of frames with a specific type of motion.

6. A video indexing device including means for carrying out a method according to claim 5.

7. An image retrieval system including:
   (1) means for carrying out an indexing method according to claim 5, for defining in a hierarchical fashion the structure of a video sequence that corresponds to successive frames, giving an indexing label to each element of the hierarchical structure thus defined, and storing said labels;
   (2) means for performing on the basis of the stored labels any image retrieval using one or several frames of said image to be retrieved.

8. A method for an automatic extraction of the structure of a video sequence that corresponds to successive frames, comprising the following steps:
   (1) a shot detection step, provided for detecting the boundaries between consecutive shots, a shot being a set of contiguous frames without editing effects;
   (2) a partitioning step, provided for splitting each shot into sub-entities, called micro-segments comprising a plurality of temporal sub-entities, each of the micro-segments having a level of homogeneity computed on a motion histogram;
   (3) a clustering step, provided for creating a final hierarchical structure of the processed video sequence;
   wherein the motion histogram on which the homogeneity of a micro-segment is computed includes a plurality of bins, each bin of which shows the percentage of frames with a specific type of motion.

* * * * *